United States Patent
Schmeichel et al.

(10) Patent No.: US 12,553,268 B1
(45) Date of Patent: Feb. 17, 2026

(54) LATCH ASSEMBLY FOR TONNEAU COVER

(71) Applicant: Bismarck Canvas, Inc., Menoken, ND (US)

(72) Inventors: Grant Patrick Schmeichel, Mandan, ND (US); Jay Anthony Schmeichel, Bismarck, ND (US); Evan Anthony Schmeichel, Mandan, ND (US)

( * ) Notice: Subject to any disclaimer, the term of this patent is extended or adjusted under 35 U.S.C. 154(b) by 89 days.

(21) Appl. No.: 18/808,019

(22) Filed: Aug. 18, 2024

(51) Int. Cl.
   *E05C 3/14* (2006.01)
(52) U.S. Cl.
   CPC .................................. *E05C 3/145* (2013.01)
(58) Field of Classification Search
   CPC ..... B60J 7/198; B60J 7/057; B60J 7/02; B60J 7/14; B60J 7/1607; B60J 7/1858; B60J 7/141; B60J 7/062; E05C 3/145
   USPC .................... 296/98, 100.01, 100.11, 100.15
   See application file for complete search history.

(56) References Cited

U.S. PATENT DOCUMENTS

| | | | |
|---|---|---|---|
| 5,076,338 | A | 12/1991 | Schmeichel et al. |
| 7,150,490 | B2 | 12/2006 | Malmberg et al. |
| 7,815,239 | B1 | 10/2010 | Schmeichel et al. |
| 9,969,249 | B2 | 5/2018 | Spencer et al. |
| 10,300,775 | B2 * | 5/2019 | Spencer ................... B60J 7/141 |
| 10,500,934 | B1 | 12/2019 | Weng et al. |
| 2004/0124657 | A1 | 7/2004 | Wheatley |
| 2005/0146158 | A1 | 7/2005 | Schmeichel et al. |
| 2007/0063529 | A1 | 3/2007 | Weldy |
| 2016/0176448 | A1 * | 6/2016 | Germano ................ B60J 7/141 |
| | | | 296/100.09 |
| 2017/0210212 | A1 * | 7/2017 | Miyamae ................... B60J 7/02 |
| 2018/0281572 | A1 * | 10/2018 | Zichettello ............... B60J 7/085 |
| 2018/0297457 | A1 | 10/2018 | Spencer |
| 2022/0001730 | A1 | 1/2022 | Cai |
| 2022/0055464 | A1 | 2/2022 | Zheng |
| 2022/0234429 | A1 | 7/2022 | Mantovani |

FOREIGN PATENT DOCUMENTS

| | | |
|---|---|---|
| EP | 2357103 A2 | 8/2011 |
| KR | 20220153312 A | 11/2022 |

OTHER PUBLICATIONS

Truxedo Tonneau Covers Installation InstructionsSource: https://images.carid.com/truxedo/tonneau-covers/pdf/1116032-truxedo-truxport-installation-instructions.pdf.
Date Accessed: Apr. 4, 2024.

* cited by examiner

Primary Examiner — Christine M Mills
Assistant Examiner — Yahya Sidky
(74) Attorney, Agent, or Firm — Antoinette M. Tease

(57) ABSTRACT

A latch assembly for a tonneau cover with a bracket, pivoting member, and spring. The spring is situated between the bracket and pivoting member and retains the pivoting member in a first position until manual force is applied to the handle of the pivoting member. The bracket forms a rearward-facing receiving area with a floor. The pivoting member has a nose with a nub that is configured to rest on top of or below the floor, depending on whether force is applied to the spring. The pivoting member has an extension that extends forwardly from the main body of the pivoting member opposite the nose and is configured to act as a stop to prevent the pivoting member from over-rotating, and a horn that extends upwardly from a top part of the main body between the nose and extension.

6 Claims, 17 Drawing Sheets

LATCH ASSEMBLY FOR TONNEAU COVER

BACKGROUND OF THE INVENTION

1. Field of the Invention

The present invention relates generally to the field of automotive accessories, and more particularly, to a latch assembly for a tonneau cover on a pickup truck.

2. Description of the Related Art

U.S. Pat. No. 5,076,338 (Schmeichel et al., 1991) provides a cover apparatus that includes a generally L-shaped end plate for stretching and fastening the cover to a frame structure. The end plate is configured to be locked into a fixed, stretching position with respect to the frame structure. In a preferred embodiment, the locking means is a pawl element for engaging and holding the stretching means in a fastened position.

U.S. Pat. No. 7,150,490 (Malmberg et al., 2006) discusses a tonneau cover system that is comprised of a tarp, a frame coupled to the vehicle, and a latch assembly. The latch assembly includes a latch bar that is attached to the free end of the cover and a pair of latch mechanisms that are configured to lock the latch bar to the frame at an attachment point. The latch mechanisms can be adjusted to change the longitudinal position of the attachment point relative to the frame.

U.S. Pat. No. 7,815,239 (Schmeichel et al., 2010) illustrates a tonneau cover assembly in which elongated side rails are provided for attachment to a sidewall of a truck cargo box. The elongated side rail comprises a securing portion that is configured to be connected to the sidewall, an inclined portion that extends from the securing portion, a connecting member that extends downwardly away from the inclined portion, and a longitudinal portion that extends from the connecting member opposite the inclined portion. The invention also includes a tonneau cover assembly comprising a flexible cover and two elongated side rail assemblies.

U.S. Pat. No. 9,969,249 (Spencer et al., 2018) discloses a tonneau cover system with side rail-mounted latches and a rear header-mounted release actuator. The latch is movably mounted to each of the side rails, and the release actuator is movably mounted to the rear header adjacent to both latches. Each latch is configured to engage the rear header in the locked position to lock the rear header and side rails together. When the release actuator is moved toward the release position, it engages both latches and moves them into an unlocked position, thereby unlocking the rear header from both of the side rails.

U.S. Pat. No. 10,300,775 (Spencer, 2019) shows a tonneau rail system with an automatic rail cover securement. The mounting assembly has a rotary member and a retainer that is connected to the side rails of a vehicle cargo box. The retainer is comprised of a receiving portion and a supporting portion that extends away from the receiving portion and is perpendicular to the axis of the receiving portion. The rotary member has a rotary portion that is rotatably engaged to the receiving portion, a lever that extends away from the rotary portion and is perpendicular to the axis of the receiving portion, and a cover seal that is configured to compressibly engage a section of the tonneau cover.

U.S. Pat. No. 10,500,934 (Weng et al., 2019) discloses a pickup truck compartment cover and a locking structure for the cover. The locking structure has two fixing side frames and a locking frame. A locking slot is provided on an inner side wall of the fixing side frame. The invention includes locking cartridge assemblies that are situated at both ends of the locking frame. A sliding cartridge assembly having a control cartridge, a sliding handled, and an inhaul cable member is configured to cause a lock tongue to break away from a locking slot.

U.S. Patent Application Pub. No. 20040124657 (Wheatley) provides a roll up tonneau cover system having a support frame, a cover, and a clamp. The clamp is configured to couple the support frame to the sidewall of the cargo box of a vehicle. The clamping system includes a hanging side member and a back member that cooperate to retain a support bracket on the vehicle sidewall. The hanging side member has a hooked flange on one end and a series of alignment depressions on the other end. The hanging side member has an aperture that is configured to receive a fastener. The back member is generally U-shaped and has a alignment head on one end and an engaging head on the other end. The alignment head is configured to fit within one of the series of alignment depressions on the hanging side member.

U.S. Patent Application Pub. No. 20050146158 (Schmeichel et al.) discloses a tonneau cover apparatus that includes a support frame that is removably attached about the perimeter of a vehicle cargo box, an elongated end plate attached to one end of the flexible cover, and end plate engagement members that are attached to the support frame. First and second locking members are movably connected to the end plate, which is retained in a fixed stretching position for the locking members, which slide within a channel in the end plate.

U.S. Patent Application Pub. No. 20070063529 (Weldy) provides a clamp for securing a tonneau cover to the bed of a pickup truck. The clamp has a base that is secured to the cover, and a handle is rotatably connected to the base. A cam part, located between the handle and the base, is configured to shift upwardly toward the base and into engagement with the truck bed when the handle is rotated, thereby securing the cover to the truck bed.

U.S. Patent Application Pub. No. 20160176448 (Germano et al.) involves a tonneau cover comprised of a plurality of panel sections that are foldable between a deployed arrangement and a folded arrangement. Each panel section has a rigid panel member with an outer face, an inner face, and a panel edge between the inner and outer faces. An edge strip defines a channel that is configured to receive the panel edge. The edge strip has an inner side that overlies the inner face of the panel section and an outer side that overlies the outer face of the panel section. A protrusion on either the inner or the outer side of the panel section is configured to engage an adjacent margin, thereby holding the edge strip to the panel member.

U.S. Patent Application Pub. No. 20170210212 (Miyame et al.) describes a tonneau cover device with a fixing device on both sides of one end of the tonneau cover. A locking portion is provided on a sidewall of the cargo chamber of the vehicle and configured to engage with the fixing device when the tonneau cover is fully extended. The fixing device includes a case with an opening opposed to the sidewall, a slider that is mounted slidably on the case, and a hook that is supported swingably on the slider. The hook has a protruding portion that is configured to retractably protrude from an opening in the case in accordance with a swinging movement of the hook, thereby engaging with the locking portion. The fixing devices also includes a spring that holds the slider against the sidewall and groove portions that are configured to receive shaft portions that slide inside of the groove portions as the hook swings.

U.S. Patent Application Pub. No. 20180281572 (Zichettello et al.) involves a flexible tonneau cover assembly with a rear rail that is removably secured to a side rail. The rear rail is rotatable between a closed position in which the cover is under tension and an open position in which the cover is loose. A securing member defines a channel and a latch engagement member. When the channel of the securing member is positioned rearward of the second end of the first side rail and the latch engagement member is positioned rearward of the channel, the securing member is in a fixed position with respect to eh first side rail. A latch is movable to engage the latch engagement member of the securing member when the rear rail is in a closed position.

U.S. Patent Application Pub. No. 20180297457 (Spencer) offers a tonneau cover system with a latch mechanism that secures the tonneau cover in the deployed position. The latch mechanism is biased in an unlocked position; in this position, the tonneau cover can be moved into an open position. The latch comprises a tailgate contact that is configured to engage the tailgate of the vehicle when it is closed, thereby moving the latch mechanism from an unlocked to a locked position.

U.S. Patent Application Pub. No. 20220001730 (Cai) discusses a locking device for a pickup truck cover. The locking device is comprised of a locking chamber assembly and a latch assembly. The lock chamber assembly includes a first fixing block with a locking bolt groove, a sliding groove, and a first mounting groove. A spring and supporting plate are situated in the first mounting groove. The lock latch assembly includes a second fixed block with a second mounting groove and a through-hole. A locking bolt is situated in the second mounting groove, and a pull rod is connected to the lock bolt via the through-hole.

U.S. Patent Application Pub. No. 2022005546 (Zheng) discloses a latching structure for a tonneau over in which a latching insert is inserted into a latching slot in a rail on a wall of a truck. A latching positioner is fastened to the latching insert, and a latching housing is releasably latched to the latching positioner. The latching insert has a first through hole and a positioning hole; the latching positioner has a second through hole that is aligned with the first through hole and a positioning pin that is aligned with the positioning hole.

U.S. Patent Application Pub. No. 20220234429 (Mantovani) describes a tonneau cover opening and locking system in which fastening and filtering components are actuated by rods. A compensating mechanism stretches the tarpaulin, which is fitted with a plastic profile. A set of actuators and locking structures are provided at both ends of the profile and fixed to the profile through a plurality of projections and grooves. A latch pin and drive rods that are configured to operate the locking structures.

BRIEF SUMMARY OF THE INVENTION

The present invention is a latch assembly for a tonneau cover comprising: a bracket that is configured to be secured to a side rail of a bed of a pickup truck; wherein the bracket is comprised of: a receiving area that is configured to receive a front end of a rear header bar of a tonneau cover; a main body that includes at least two apertures that are configured to receive bolts; and an arm that extends upwardly from the main body at a front end of the bracket; and wherein the receiving area is located on a rear end of the bracket and includes a ledge; a pivoting member that is pivotally connected to the bracket; wherein the pivoting member is comprised of a handle, a nose, a main body, and a horn; wherein the handle forms a bottom part of the pivoting member, the nose is situated to a rear of the main body and forms a rear part of the pivoting member, the main body includes an extension that extends forwardly from the main body opposite the nose, and a horn that extends upwardly from a top part of the main body between the nose and the extension; wherein the nose has a rear arcuate edge; wherein the nose and the horn together form a boot-shaped recess in the pivoting member; and wherein the pivoting member further comprises a nub that is situated on an outer surface of a tip of the horn and configured to rest on top of or below the ledge of the receiving area, depending on a level of pressure applied to the handle by an operator; and a spring that is situated between the main body of the pivoting member and the bracket around a boss that is part of the pivoting member; wherein a first end of the spring is attached to the pivoting member, and a second end of the spring is attached to the bracket; and wherein the spring is configured to maintain the pivoting member in a first position relative to the bracket until and unless manual force is applied to the handle of the pivoting member.

In a preferred embodiment, the handle, the nose, the main body, the horn, the extension, and the boss of the pivoting member are all made of a single, molded plastic part. Preferably, the extension of the pivoting member is configured to act as a stop to prevent the pivoting member from over-rotating. The handle of the pivoting member is also configured to act as a stop to prevent the pivoting member from over-rotating.

In a preferred embodiment, the arm of the bracket is configured to form a vertically oriented slot that is open at a top of the slot and configured to receive a zipper slide pull. The main body of the bracket preferably comprises a hole that is situated rearward of the slot and configured to secure a corner strap assembly of a tonneau cover.

REFERENCE NUMBERS

Figure 1:
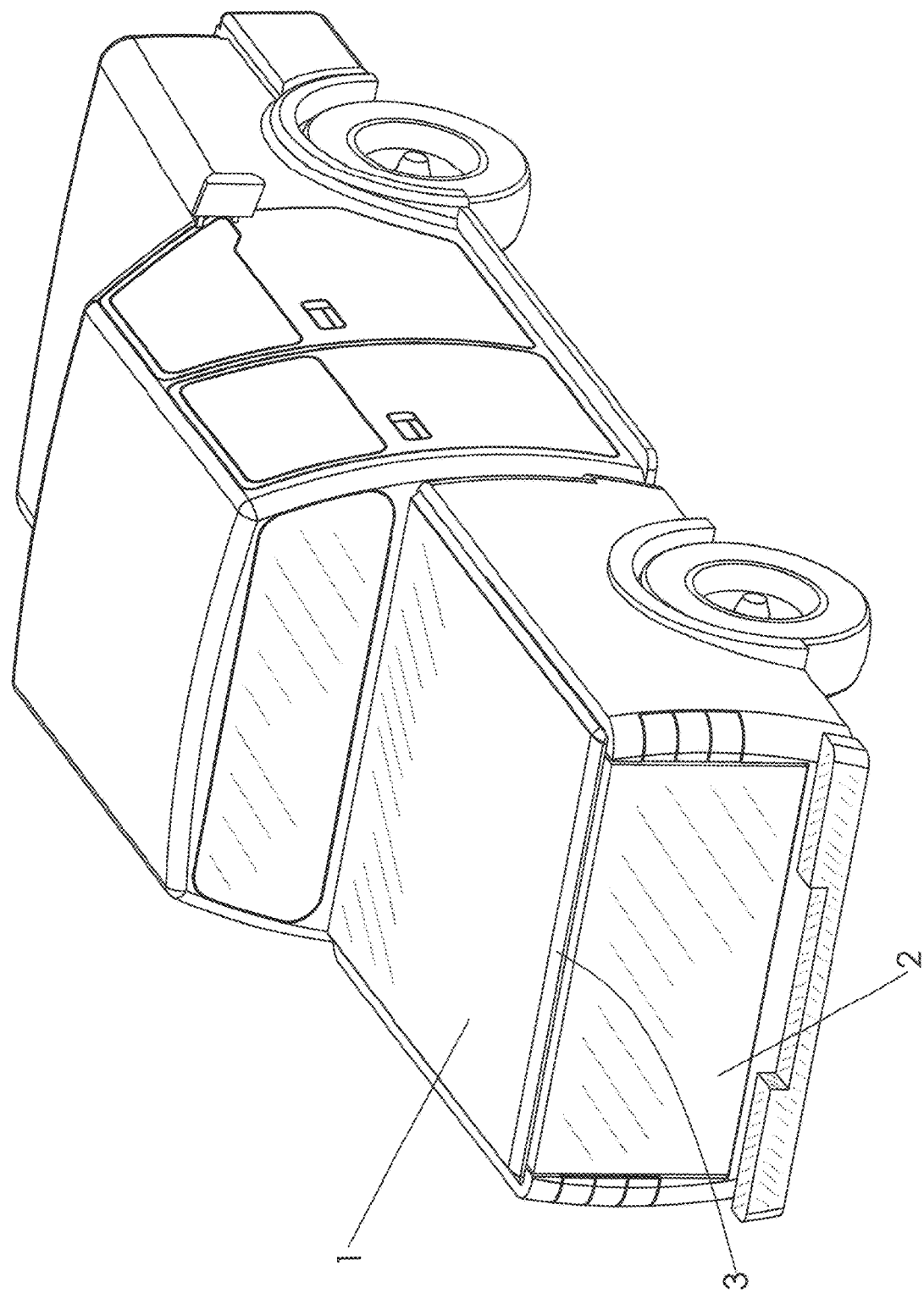
FIG. 1 is a perspective view of a pickup truck with a tonneau cover.

1 Tonneau cover
2 Tailgate
3 Rear header bar
3a Front end (of rear header bar)
4 Latch assembly
5 Side rail (of vehicle)
6 Channel (in side rail)
7 Pivoting member
7a Handle (of pivoting member)
7b Nose (of pivoting member)
7c Main body (of pivoting member)
7d Horn (of pivoting member)
7e Extension (of pivoting member)
7f Rear arcuate edge (of nose)
7g Boss (of pivoting member)
8 Bracket
8a Receiving area (of bracket)
8b Main body (of bracket)
8c Arm (of bracket)
8d Floor/ledge (of receiving area)
8e Slot (in bracket)
8f Hole (in bracket)
9 Bolt (securing bracket to side rail)
10 Nut
11 Bolt (pivot point of pivoting member)
12 Aperture/pivot point
13 Spring
14 Nub
15 Recess

DETAILED DESCRIPTION OF INVENTION

FIG. 1 is a perspective view of a pickup truck with a tonneau cover. This figure is provide simply to provide context for the present invention. As shown in this figure, the tonneau cover 1 extends from the rear of the cab to the tailgate 2 and covers the entire cargo bed. Along the rear edge of the tonneau cover 1 is a rear header bar 3, which extends the full width of the cargo box.

Figure 2:
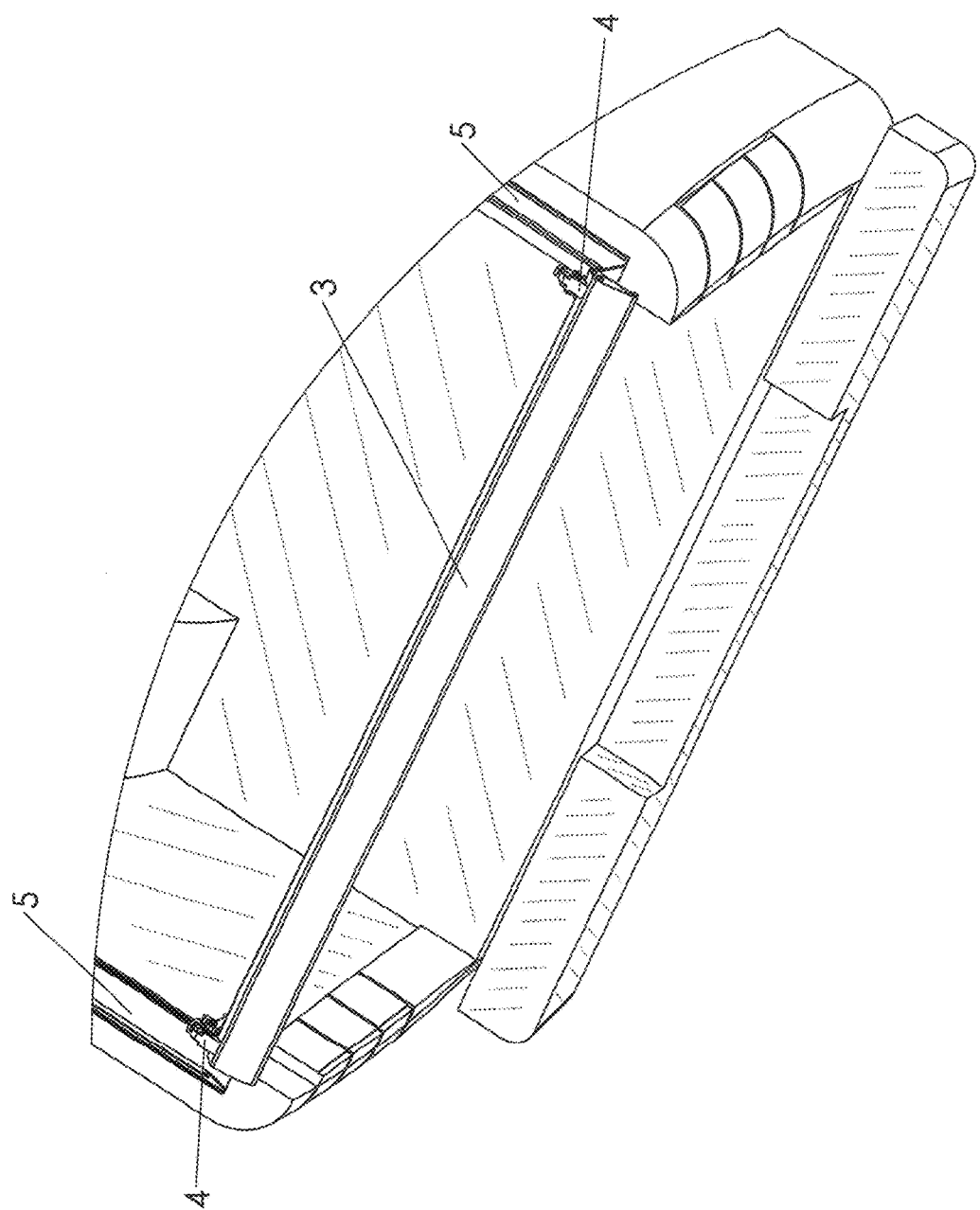
FIG. 2 is a detail top perspective view of the rear header bar shown in relation to the latch assembly of the present invention shown with the tonneau cover itself omitted for clarity.

FIG. 2 is a detail top perspective view of the rear header bar shown in relation to the latch assembly of the present invention shown with the tonneau cover itself omitted for clarity. As shown in this figure, the latch assembly 4 of the present invention is situated at the rear end of the side rail 5 of the vehicle. The latch assembly 4 may be installed on the right side rail, the left side rail, or both. The tailgate 2 has also been removed from this figure for ease of illustration.

Figure 3:
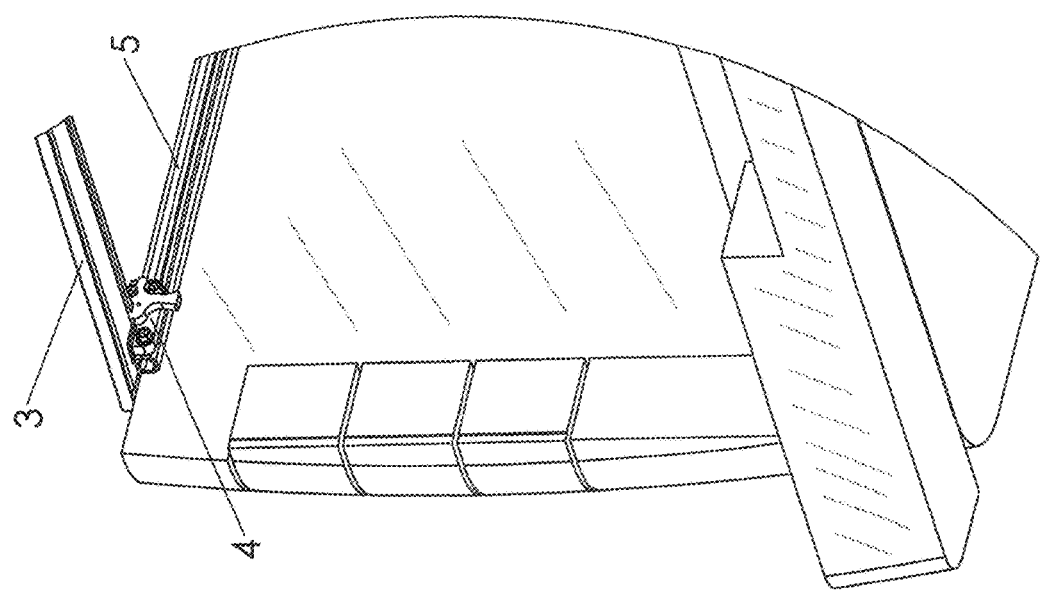
FIG. 3 is a bottom perspective view of the latch assembly shown in relation to a first end of the rear header bar.

FIG. 3 is a bottom perspective view of the latch assembly shown in relation to a first end of the rear header bar. This figure provides a detail view of the left side rail 5 of the vehicle shown in relation to the latch assembly 4. The rear header bar 3 rests on top of the side rail 5. The latch assembly 4 is affixed to the side rail 5 via a channel 6 along the inner edge of the side rail (see FIG. 4).

Figure 4:
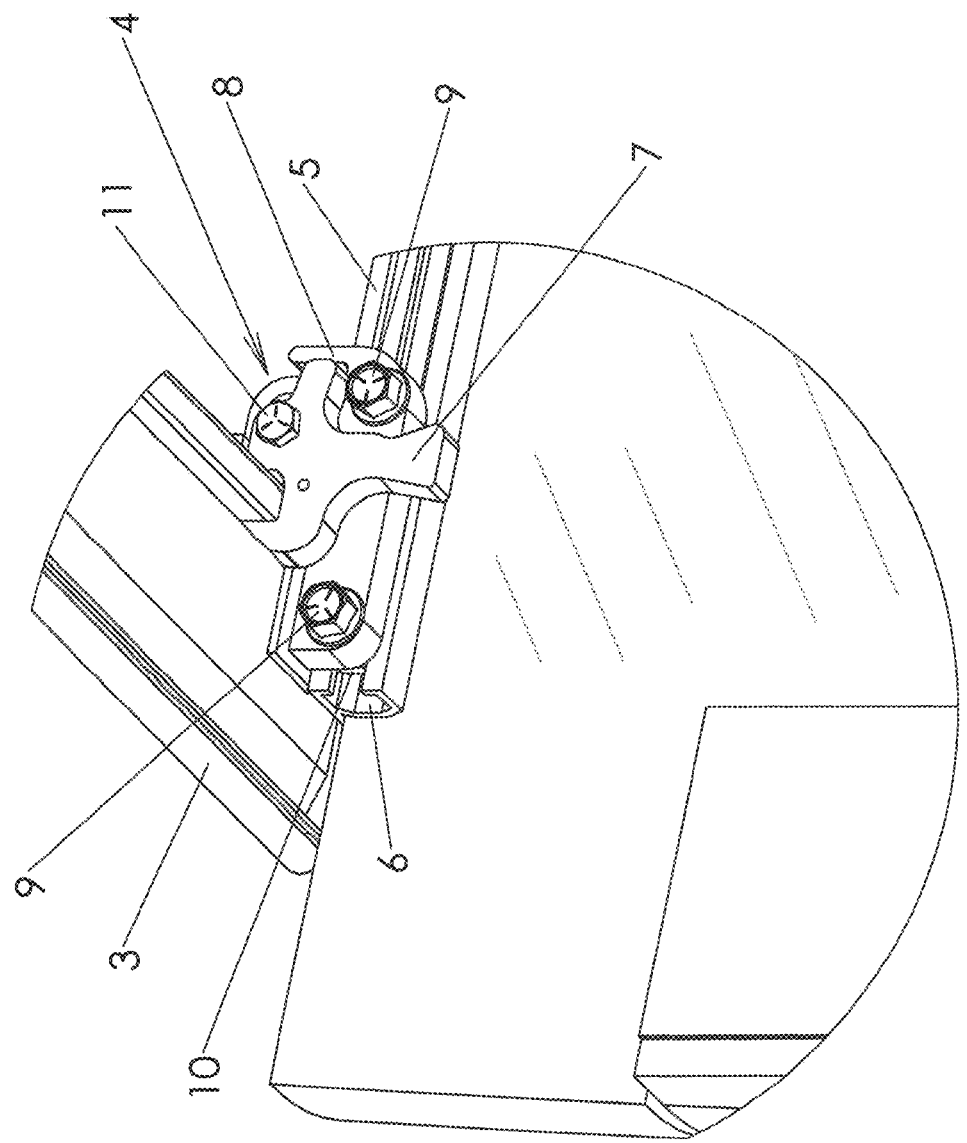
FIG. 4 is a detail view of the latch assembly shown in FIG. 3.

FIG. 4 is a detail view of the latch assembly shown in FIG. 3. As shown in this figure, the present invention is comprised of a pivoting member 7 and a bracket 8. The bracket 8 is secured to the side rail 5 via bolts 9 that extend into a channel 6 in the side rail; this channel 6 is configured to accept a nut 10 on the end of each bolt 9. In this manner, the bracket 8 is fixedly attached to the side rail 5. The pivoting member 7 is pivotally connected to the bracket 8 via a bolt 11, which is fixedly attached to the pivoting member and configured to rotate within an aperture 12 (see FIG. 11) in the bracket 8. This aperture 12 is the point about which the pivoting member 7 rotates. A spring 13 (see FIG. 5) is situated between the main body 7a of the pivoting member 7 and the bracket 8; one end of the spring 13 is attached to the pivoting member 7, and the other end of the spring is attached to the bracket 8. The spring 13 is situated around a boss 7g that is part of the pivoting member 7 (see FIG. 11).

Figure 5:
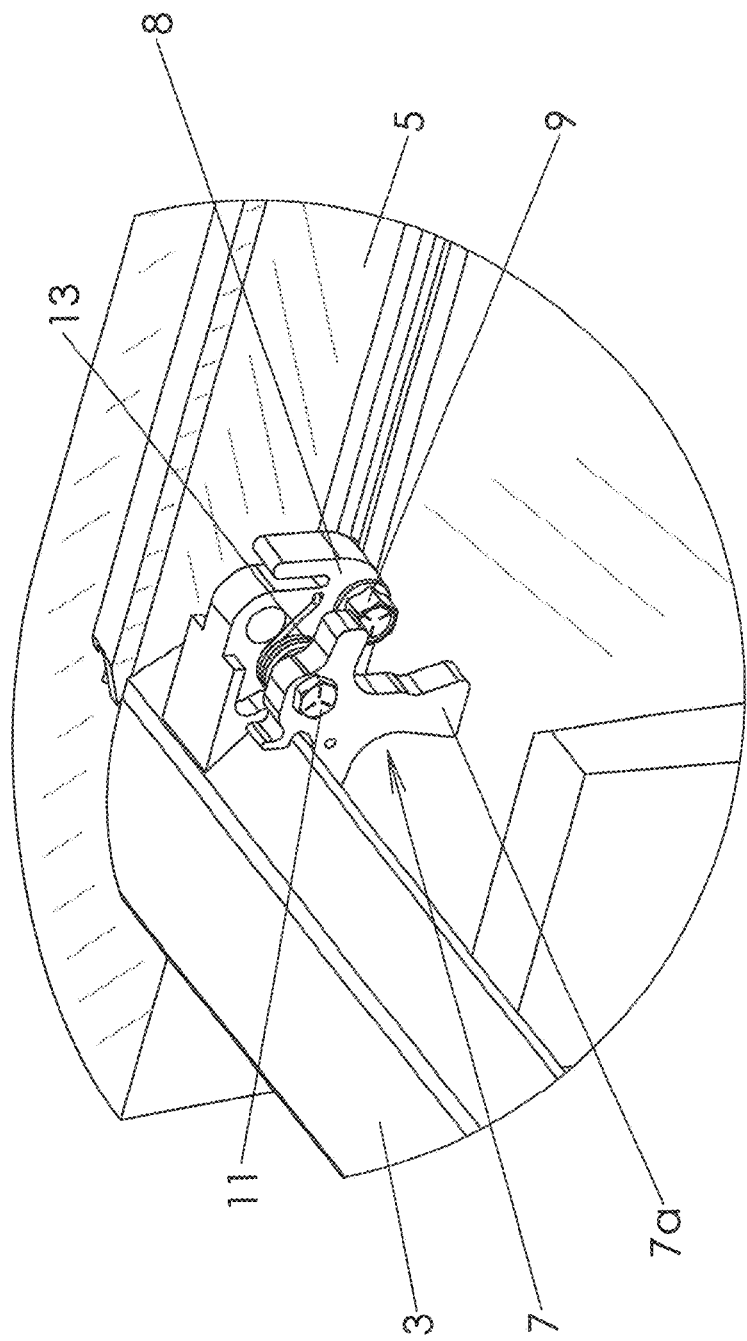
FIG. 5 is a detail perspective view of the same latch assembly shown in FIG. 4 but from a top perspective.
Figure 6:
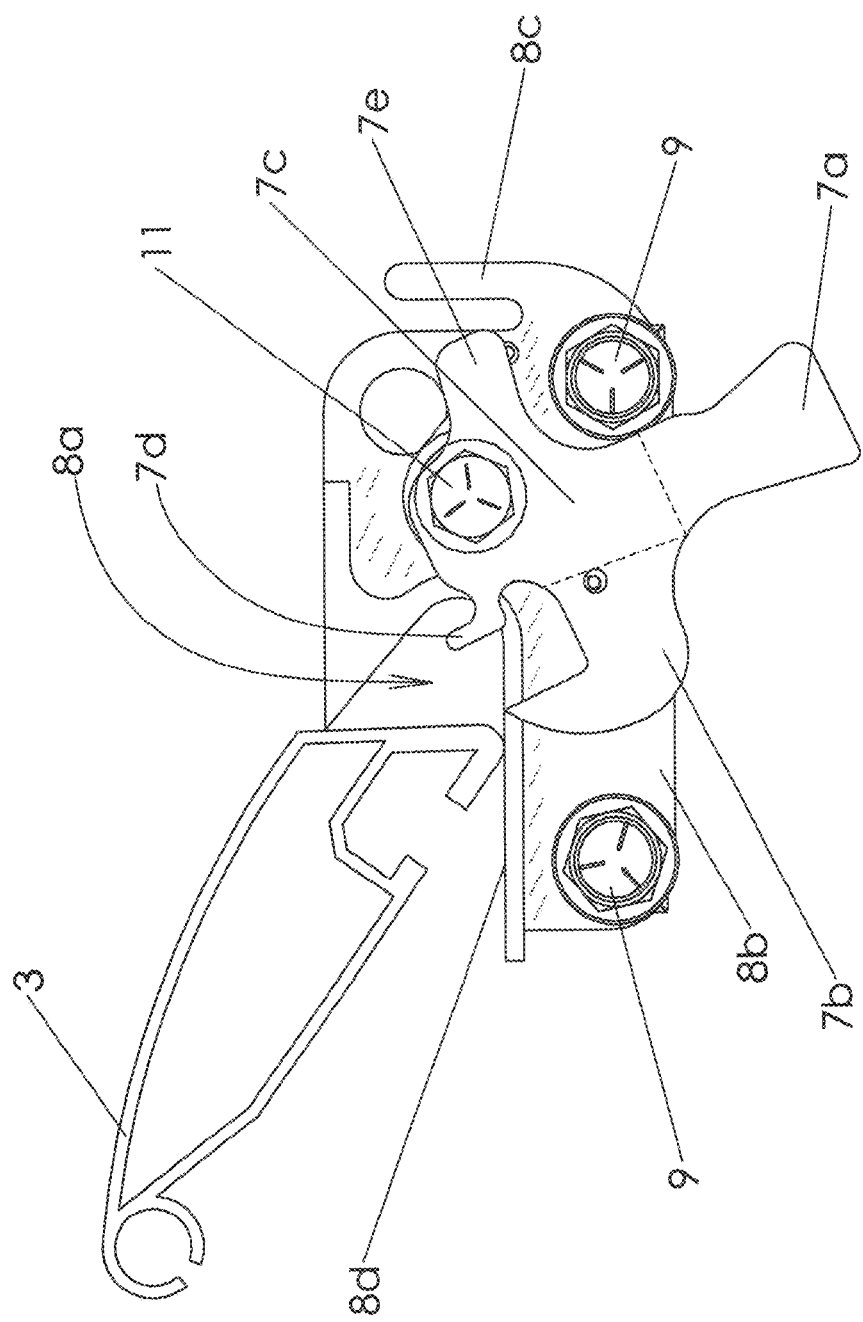
FIG. 6 is a side view of the present invention shown in relation to the rear header bar prior to insertion of the rear header bar into the latch assembly.

FIG. 5 is a detail perspective view of the same latch assembly shown in FIG. 4 but from a top perspective. In this figure, the pivoting member 7 is shown in a first position relative to the bracket 8. The pivoting member 7 is comprised of a handle 7a, a nose 7b, a main body 7c, and a horn 7d (see FIG. 6). The handle 7a forms the bottom part of the pivoting member 7. The nose 7b is situated to the rear of the main body 7c and forms the rear part of the pivoting member. The main body 7c encompasses the pivot point at bolt 11 and includes an extension Ze that extends forwardly (toward the cab of the vehicle). The horn 7d extends upwardly from a top part of the main body 7c between the nose 7b and the extension 7e. The nose 7b and horn 7d together form a boot-shaped recess 15 in the pivoting member 7, as shown in FIG. 6 (see also FIG. 9). As manual pressure is placed upon the handle 7a in a forward direction (that is, toward the cab of the vehicle) by the operator, the handle 7a rotates forwardly, the nose 7b rotates downwardly, and the extension 7e rotates upwardly. In other words, the entire pivoting member 7 rotates in a counter-clockwise direction in the configuration shown in FIG. 6. In a preferred embodiment, the handle 7a, nose 7b, main body 7c, horn 7d and extension 7e are all made of a single, molded plastic part.

FIG. 6 is a side view of the present invention shown in relation to the rear header bar prior to insertion of the rear header bar into the latch assembly. Note that the bracket 8 is comprised of a receiving area 8a that is configured to receive an end of the rear header bar 3, a main body 8b that includes apertures through which the bolts 9 are inserted to affix the bracket 8 to the side rail 5 of the vehicle, and an arm &c that extends upwardly from the main body &b at the front end of the bracket. The receiving area 8a is on the back side of the bracket 8. In FIG. 6, the front side of the bracket is to the right, and the rear side of the bracket is to the left. The receiving area 8a is situated on top of the rear half of the main body 8b. The rear header bar 3 can be inserted into the receiving area 8a when the latch assembly is in the position shown in FIG. 6 (that is, a locked and open position) or when the latch assembly is in the position shown in FIG. 9. In the former position, the front end 3a of the rear header bar applies force to the rear surface of the horn 7d (see FIG. 7) until the nub 14 is over the ledge 8d. In the latter position, the nub 14 is already over the ledge 8d, and the front end of the rear header bar applies force to the arcuate edge 7f of the nose 7 until the front end of the rear header bar slides into the receiving area 8a. See further discussion of nub 14 below.

In FIG. 6, the pivoting member 7 is in a different position than that shown in FIGS. 4 and 5. In this figure, the handle 7a has been rotated forward, causing the nose 7b to pivot downwardly until the tip of the nose is beneath the level of the floor 8d of the receiving area 8a. A nub 14 on the outer surface of the tip of the horn (see FIG. 11) maintains the pivoting member 7 in this position against the force of the spring. In this position, the nub 14 is situated directly underneath the ledge that forms the floor 8d to the receiving area 8a (see FIG. 16). In the first position shown in FIGS. 4 and 5, the nub 14 is above this ledge. To move the pivoting member from the first position shown in FIGS. 4 and 5 to the second position shown in FIG. 6, the operator must apply sufficient manual force to the handle 7a to move the nub 14 from above the ledge 8d to beneath the ledge. The dotted lines on the pivoting member 7 in FIG. 6 are for illustrative purposes only (to differentiate the handle 7a, the nose 7b, and the main body 7c) and do not form part of the invention.

Figure 7:
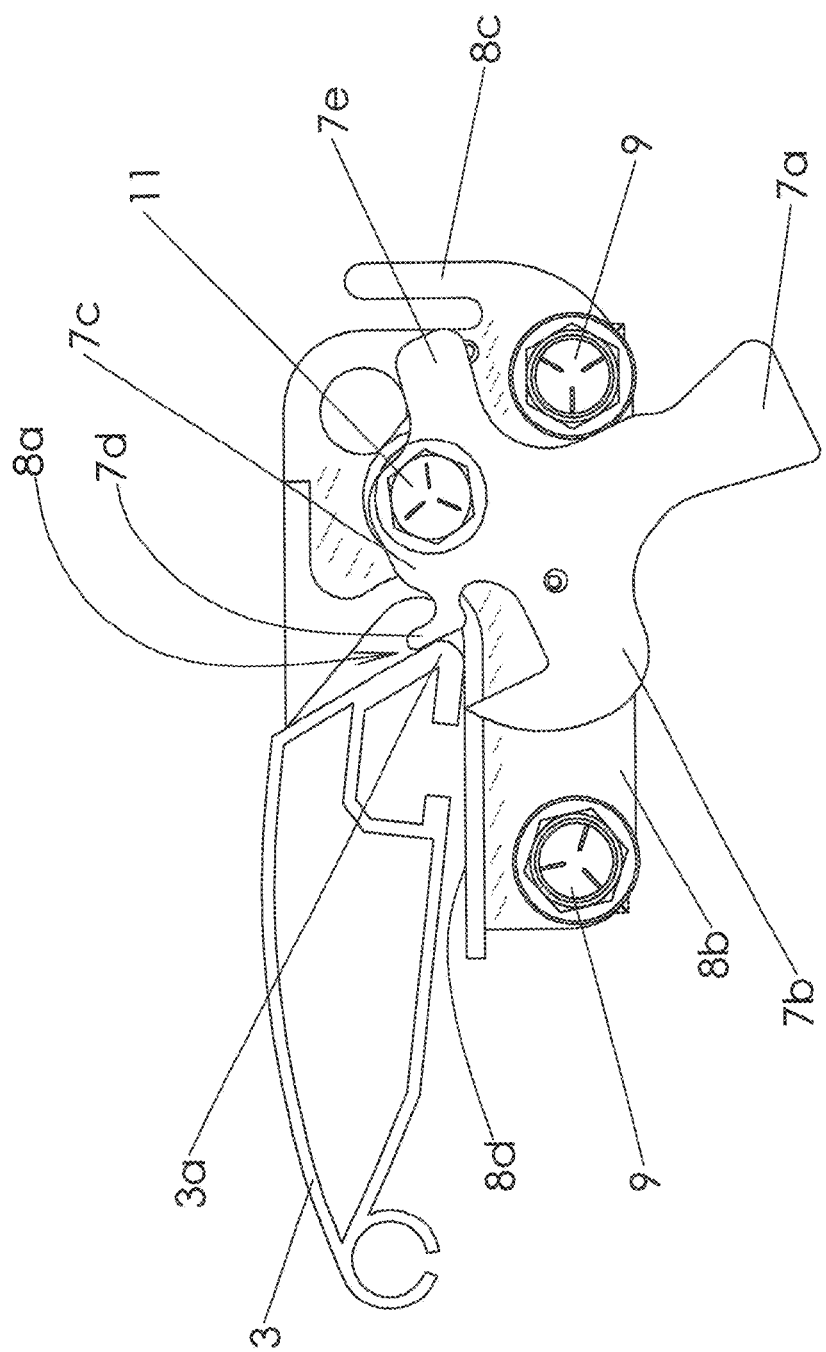
FIG. 7 is a side view of the present invention shown in relation to the rear header bar as it is inserted into the latch assembly.

FIG. 7 is a side view of the present invention shown in relation to the rear header bar as it is inserted into the latch assembly. In this figure, the front end 3a of the rear header bar 3 has been positioned so that it abuts up against the horn 7d on the pivoting member 7. Note that the handle 7a acts as a stop in this position by abutting up against bolt 9.

Figure 8:
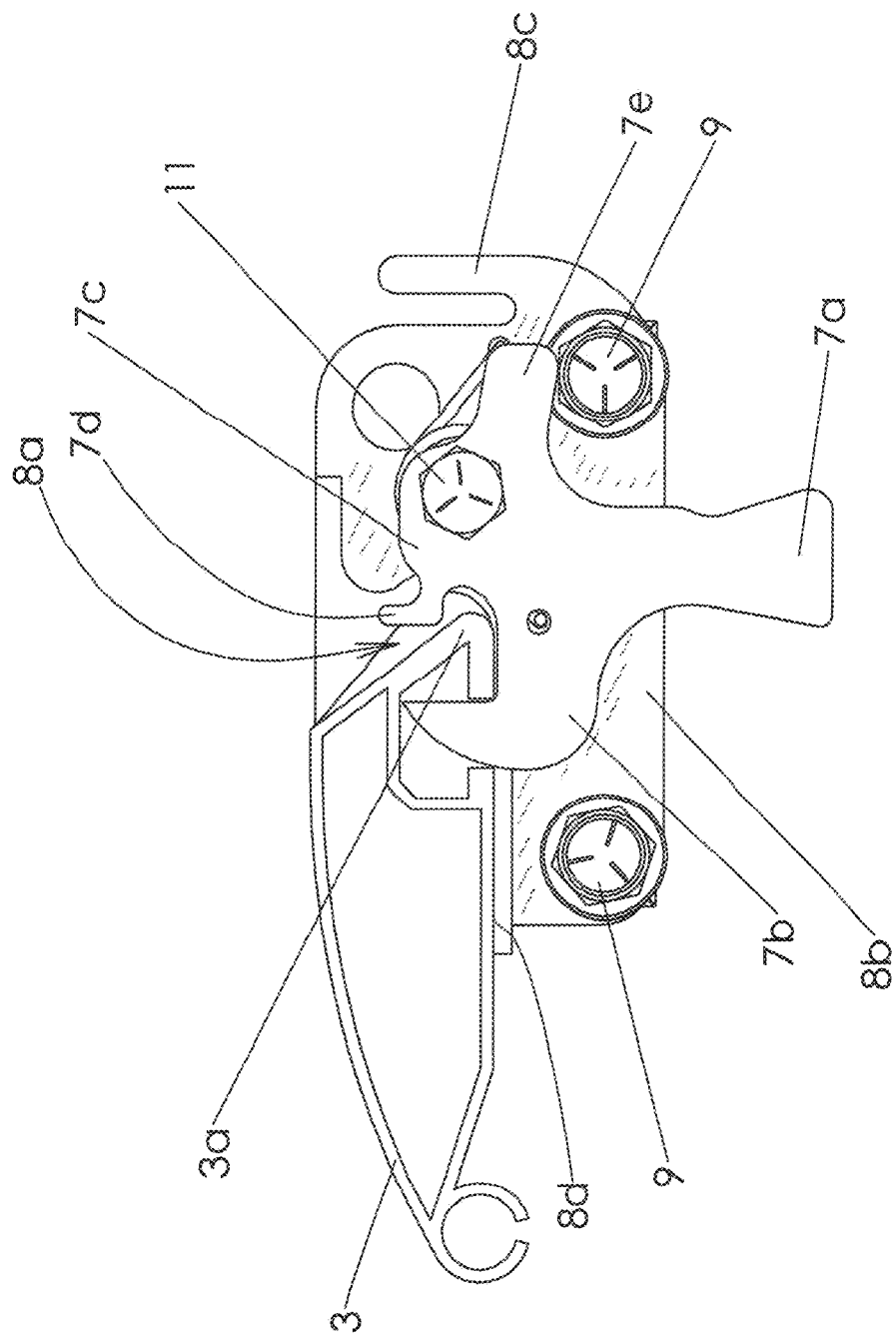
FIG. 8 is a side view of the present invention shown in relation to the rear header bar after it has been inserted into the latch assembly.

FIG. 8 is a side view of the present invention shown in relation to the rear header bar after it has been inserted into the latch assembly. As the front end 3a of the rear header bar 3 is pushed against the horn 7d, the pivoting member 7 is forced to pivot in a clockwise direction (compare FIGS. 7 and 8), thereby moving the nub 14 to a position over the ledge 8d. The spring 13 is configured to hold the pivoting member 7 in this position until manual force is applied to the handle 7a, as described above.

Figure 9:
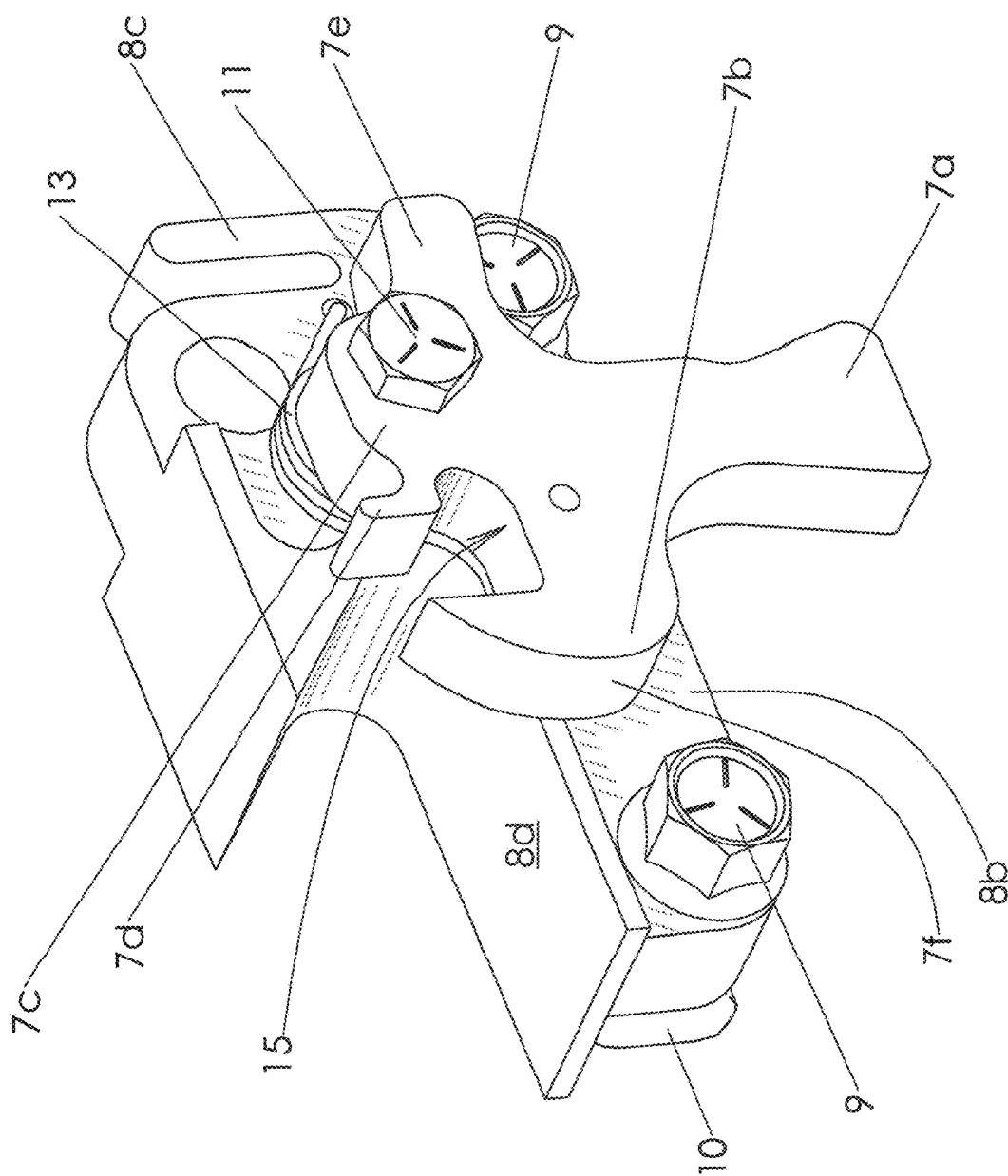
FIG. 9 is a rear detail perspective view of the present invention.
Figure 10:
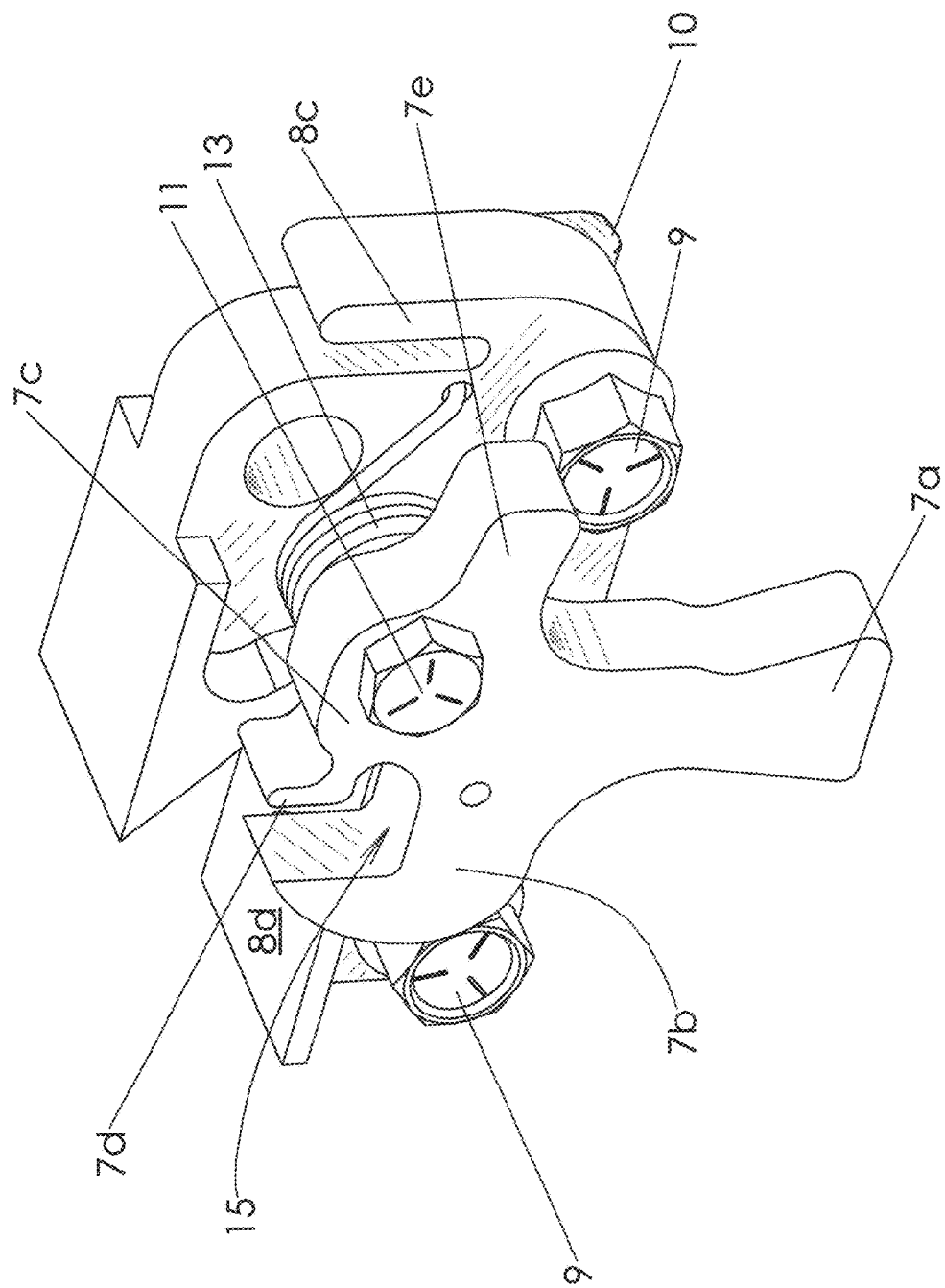
FIG. 10 is a front detail perspective view of the present invention.

FIG. 9 is a rear detail perspective view of the present invention, and FIG. 10 is a front detail perspective view of the present invention. In these two figures, the latch assembly is in a first position; that is, the nub 14 (see FIG. 11) is positioned over the ledge 8d. In this position, no force is being placed on the handle 7a, and the spring 13 is configured to maintain the pivoting member in this position until and unless one of two things happens-either manual force is placed on the handle 7a by the operator, or the rear header bar 3 is pressed up against the rear arcuate edge 7f of the nose 7b. Note that the extension 7d is configured to act as a stop by abutting up against bolt 9, thereby preventing the pivoting member from over-rotating (see also FIG. 13).

Figure 11:
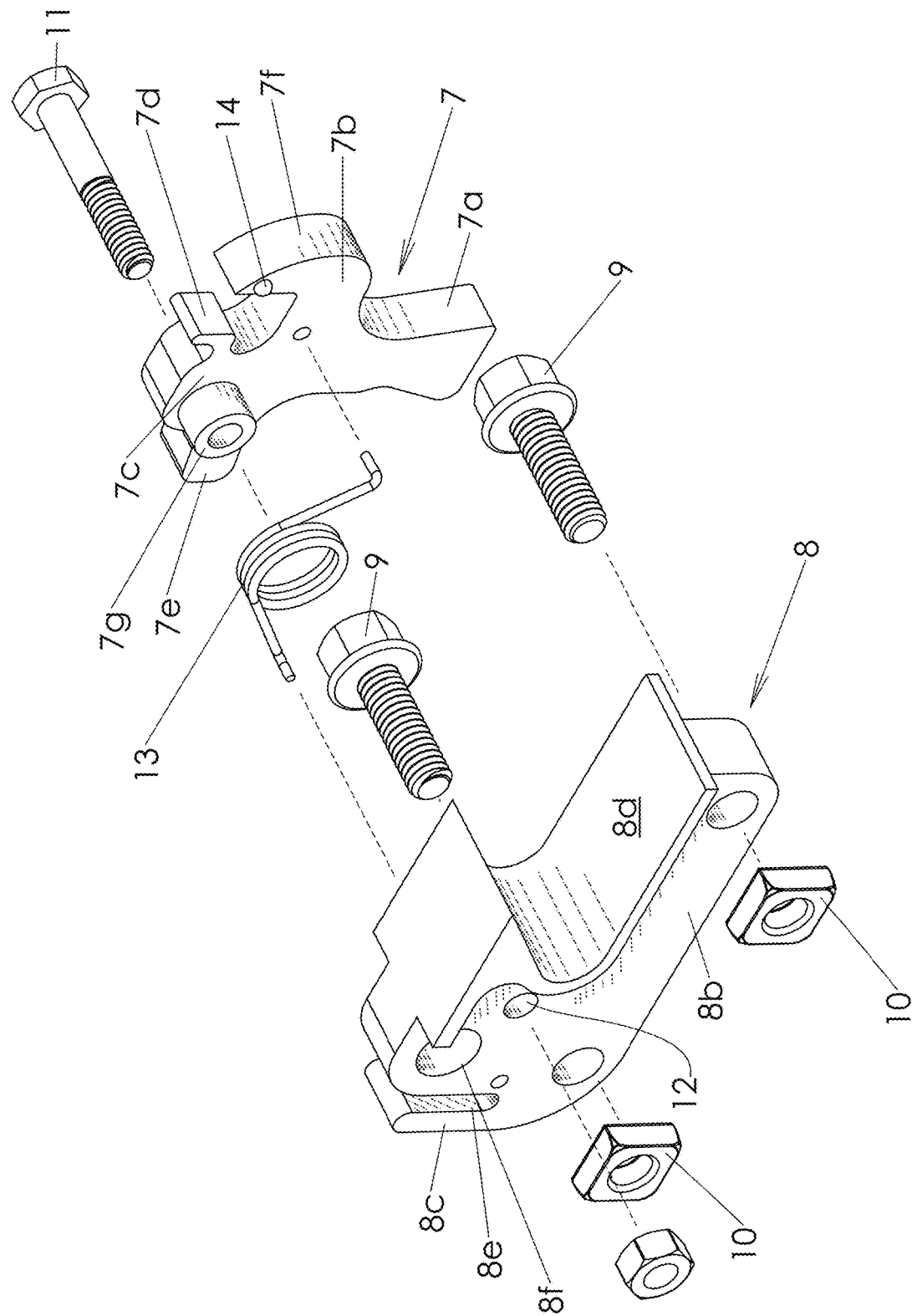
FIG. 11 is an exploded view of the present invention.

FIG. 11 is an exploded view of the present invention. Note that the arm &c of the bracket 8 is configured to form a vertically oriented slot Be that is open at the top. This slot Se is configured to receive a zipper slide pull (not shown), which is not part of the present invention. A hole Sf in the bracket 8 is configured to secure a corner strap assembly (not shown), which is also not part of the present invention.

Figure 12:
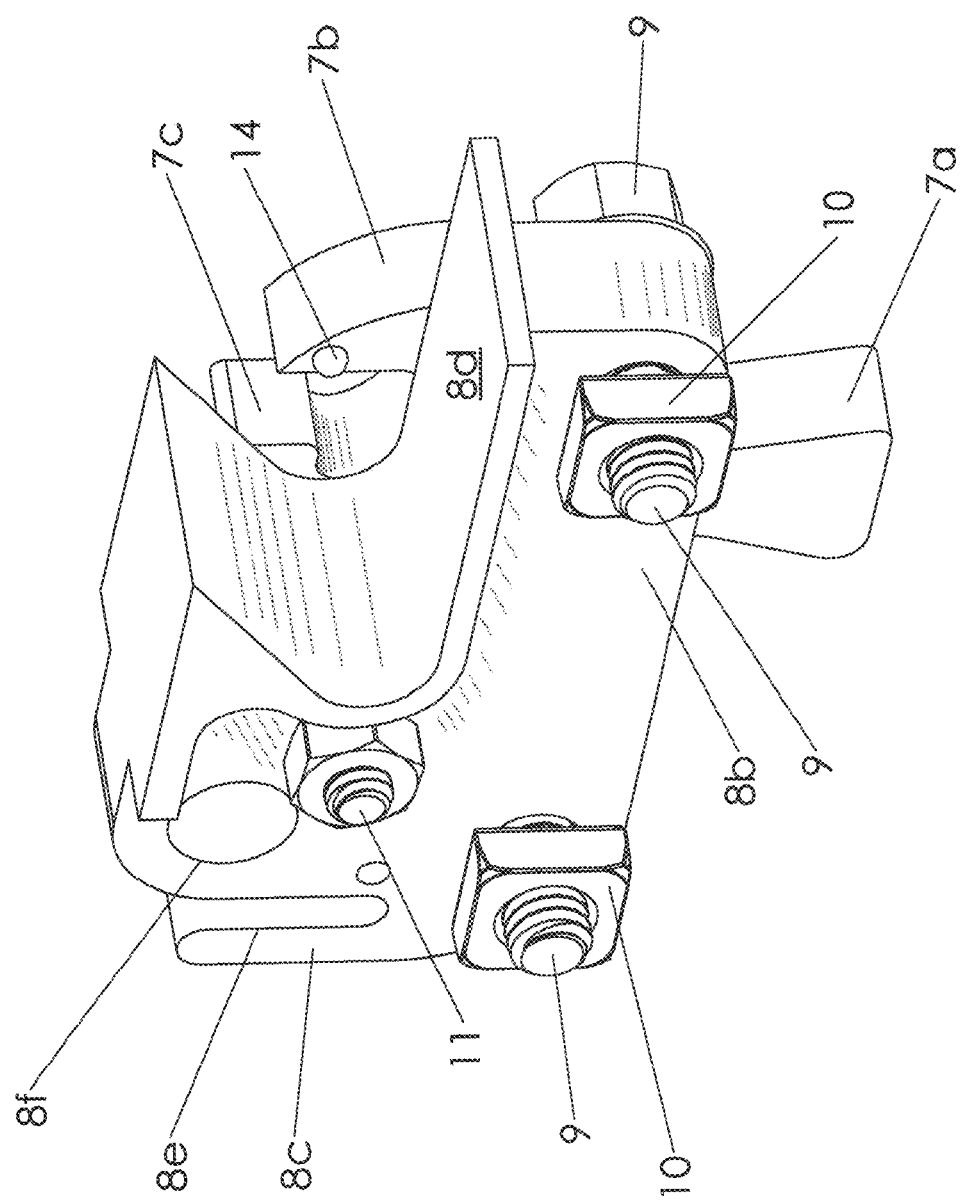
FIG. 12 is a side perspective view of the present invention.

FIG. 12 is a side perspective view of the present invention. This figure shows the bolt 11 that acts as the pivot point for the pivoting member 7. It also shows the nuts 10 that are situated within the side rail 5 of the vehicle when the present invention is installed.

Figure 13:
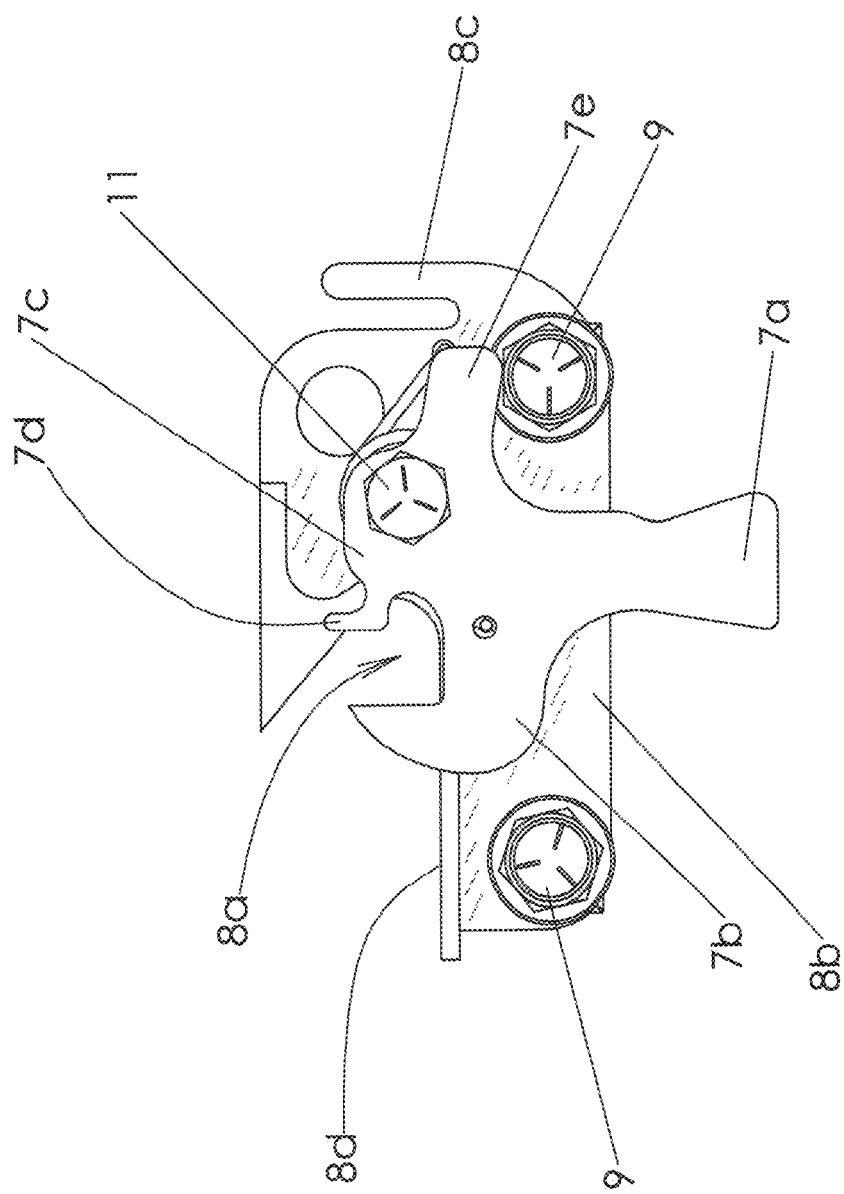
FIG. 13 is a side view of the present invention with the pivoting member in a first position.
Figure 14:
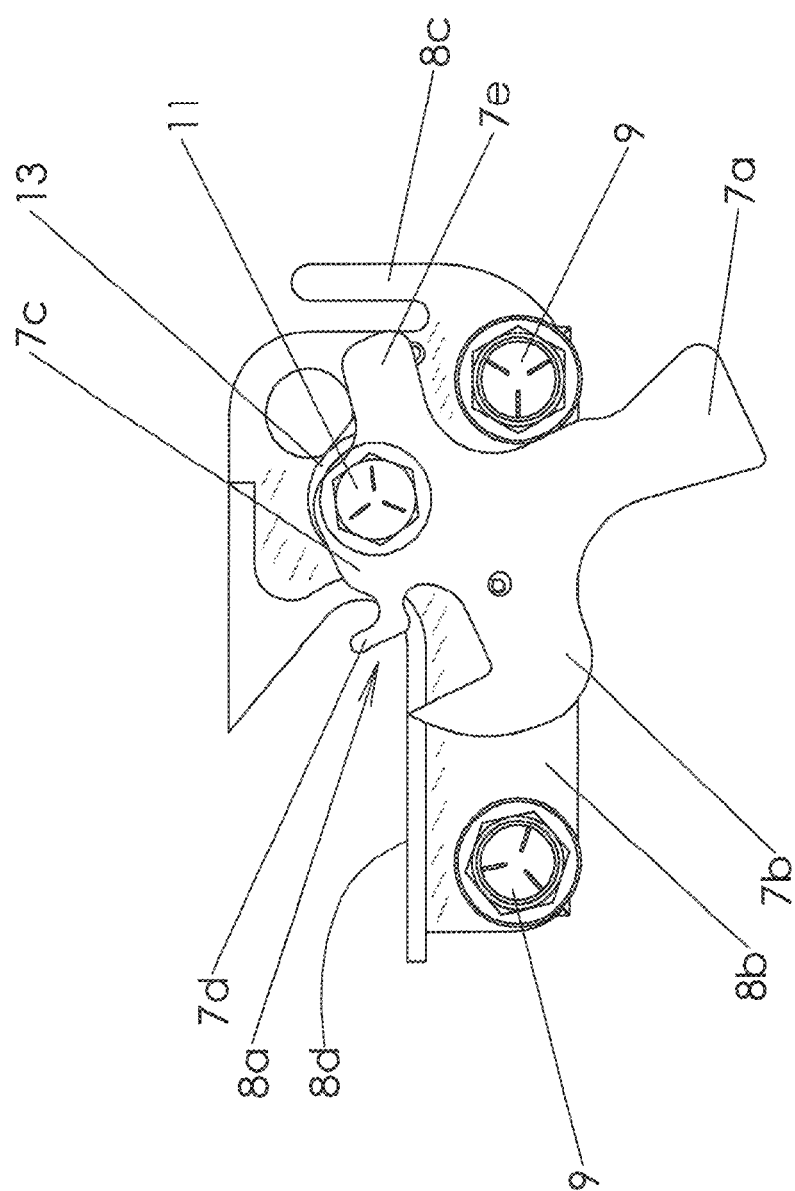
FIG. 14 is a side view of the present invention with the pivoting member in a second position.
Figure 15:
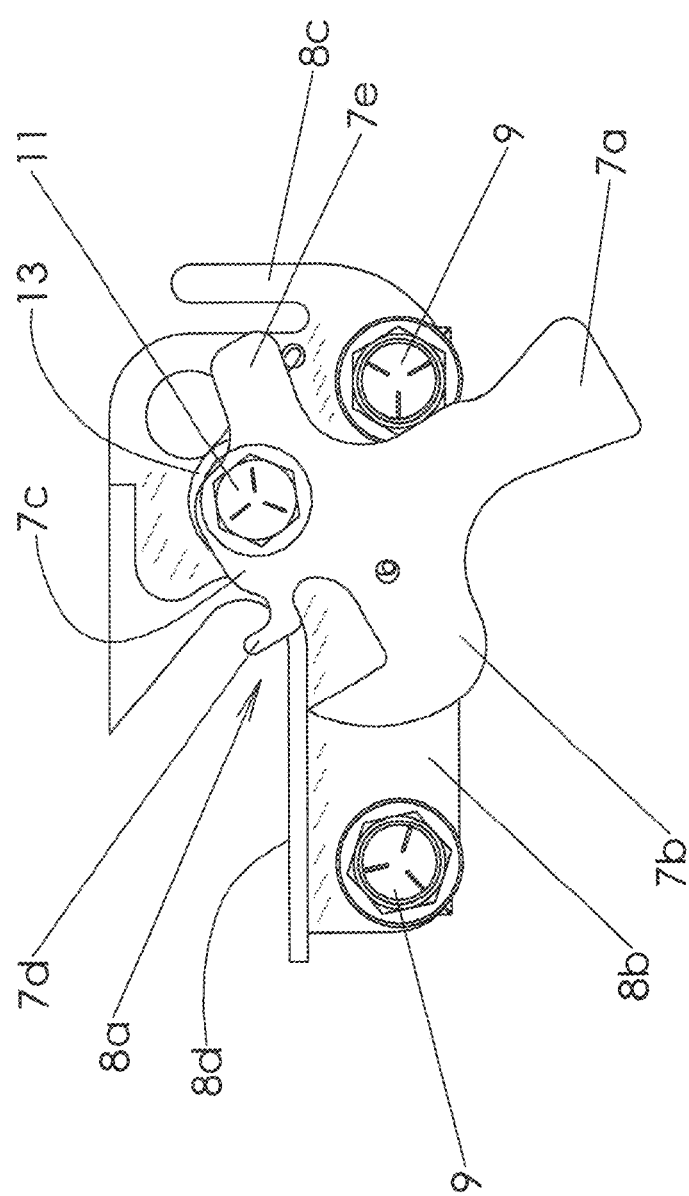
FIG. 15 is a side view of the present invention with the pivoting member in a third position.

FIG. 13 is a side view of the present invention with the pivoting member in a first position, FIG. 14 is a side view of the present invention with the pivoting member in a second position, and FIG. 15 is a side view of the present invention with the pivoting member in a third position. As shown in these three figures, the pivoting member can be in a first position in which the nub 14 is situated above the ledge 8d. In this position, the extension 7e abuts up against the bolt 9, which prevents the pivoting member 7 from over-rotating in a clockwise direction. In the second position, the nub 14 is now underneath the ledge 8d and holding the pivoting member 7 in this position against the force of the spring 13. In third position, the handle 7a abuts up against the bolt 9, thereby preventing the pivoting member 7 from over-rotating in a counter-clockwise direction.

Figure 16:
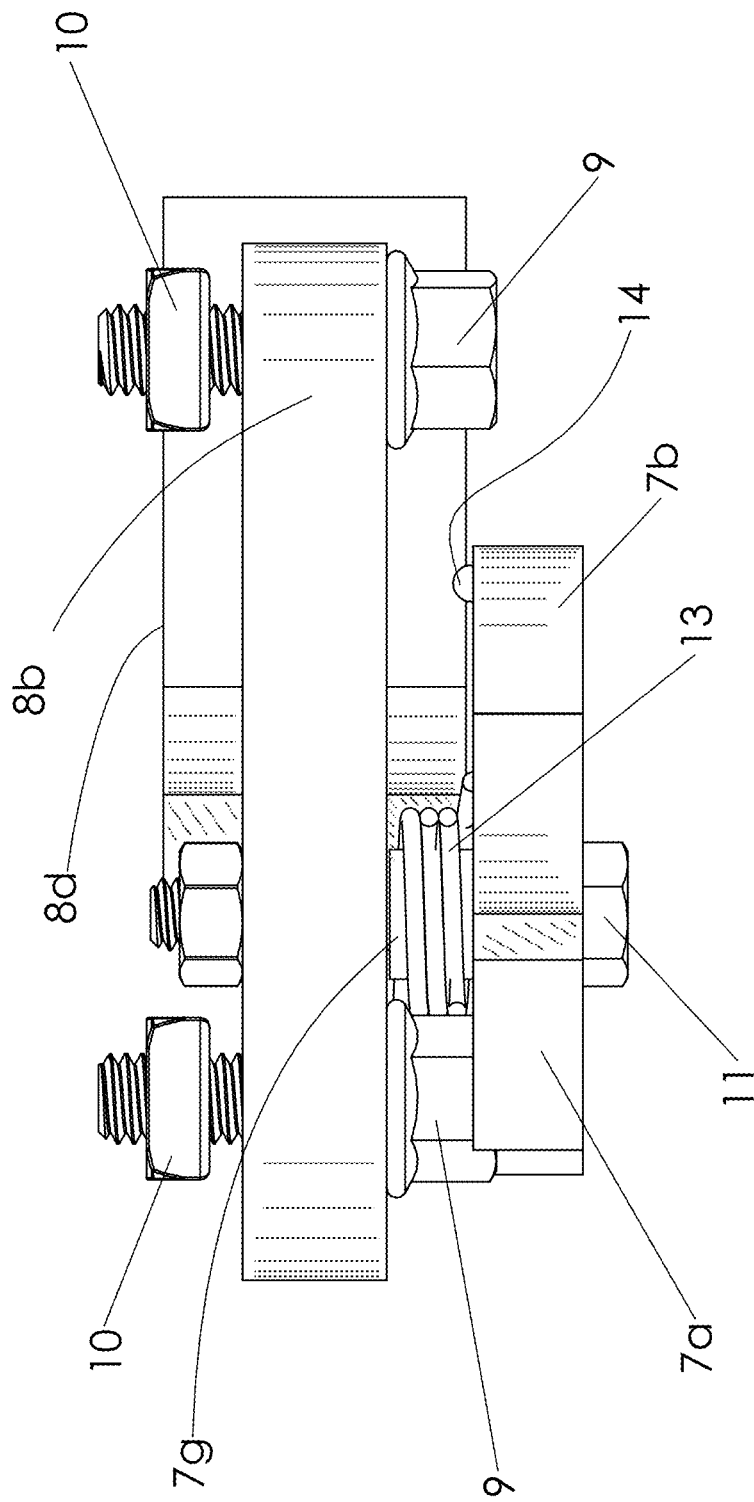
FIG. 16 is a bottom view of the present invention.
Figure 17:
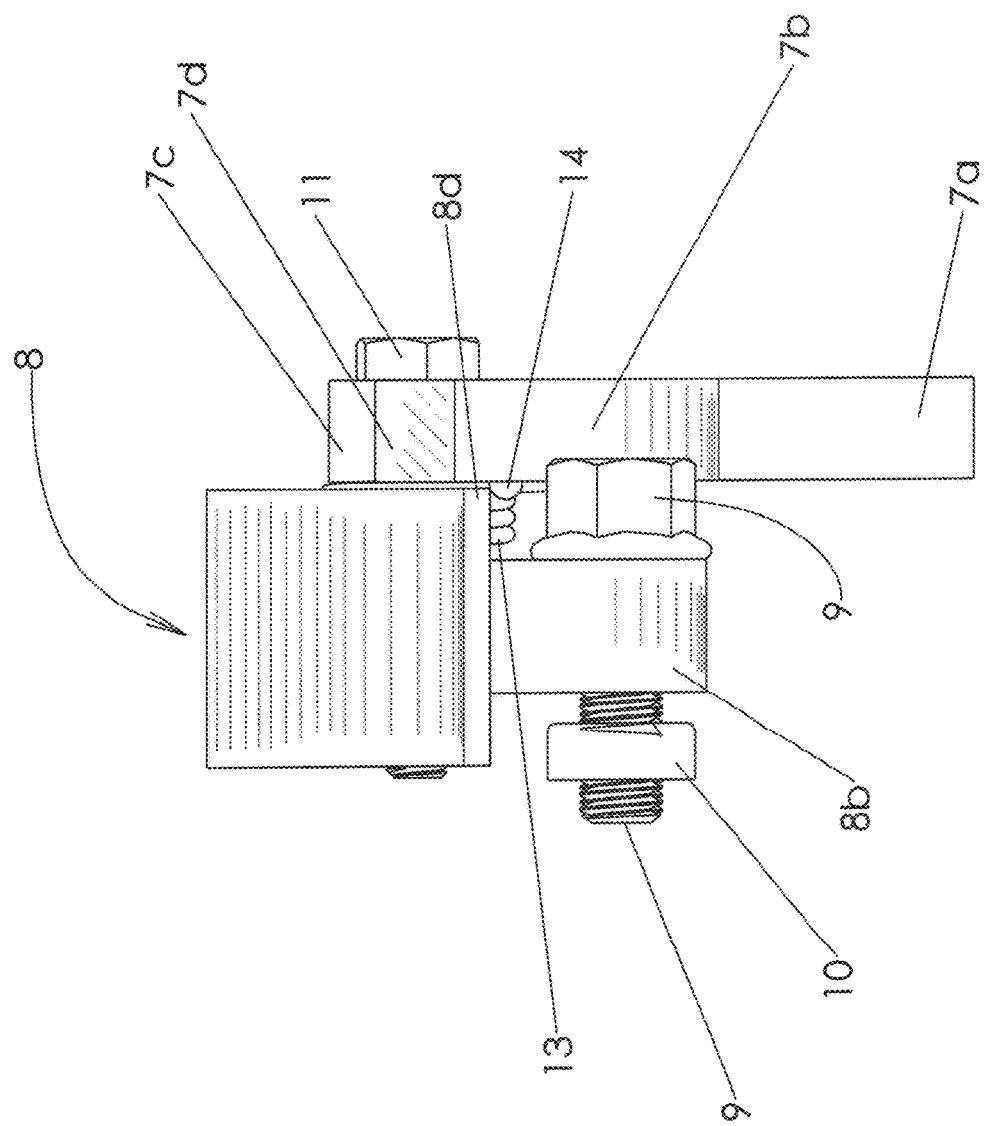
FIG. 17 is a rear view of the present invention.

FIG. 16 is a bottom view of the present invention, and FIG. 17 is a rear view of the present invention. All parts have been previously discussed, but these two figures clearly show the nub 14 on the inside surface of the pivoting member 7. In these two figures, the pivoting member 7 is in the position shown in FIG. 14.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A latch assembly for a tonneau cover comprising:
   (a) a bracket that is configured to be secured to a side rail of a bed of a pickup truck;
      wherein the bracket is comprised of: a receiving area that is configured to receive a front end of a rear header bar of a tonneau cover; a main body that includes at least two apertures that are configured to receive bolts; and an arm that extends upwardly from the main body at a front end of the bracket; and
      wherein the receiving area is located on a rear end of the bracket and includes a ledge;
   (b) a pivoting member that is pivotally connected to the bracket;
      wherein the pivoting member is comprised of a handle, a nose, a main body, and a horn;
      wherein the handle forms a bottom part of the pivoting member, the nose is situated to a rear of the main body and forms a rear part of the pivoting member, the main body includes an extension that extends forwardly from the main body opposite the nose, and a horn that extends upwardly from a top part of the main body between the nose and the extension;
      wherein the nose has a rear arcuate edge;
      wherein the nose and the horn together form a boot-shaped recess in the pivoting member; and
      wherein the pivoting member further comprises a nub that is situated on an outer surface of a tip of the horn and configured to rest on top of or below the ledge of the receiving area, depending on a level of pressure applied to the handle by an operator; and
   (c) a spring that is situated between the main body of the pivoting member and the bracket around a boss that is part of the pivoting member;
      wherein a first end of the spring is attached to the pivoting member, and a second end of the spring is attached to the bracket; and
      wherein the spring is configured to maintain the pivoting member in a first position relative to the bracket until and unless manual force is applied to the handle of the pivoting member.

2. The latch assembly of claim 1, wherein the handle, the nose, the main body, the horn, the extension, and the boss of the pivoting member are all made of a single, molded plastic part.

3. The latch assembly of claim 1, wherein the extension of the pivoting member is configured to act as a stop to prevent the pivoting member from over-rotating.

4. The latch assembly of claim 1, wherein the handle of the pivoting member is configured to act as a stop to prevent the pivoting member from over-rotating.

5. The latch assembly of claim 1, wherein the arm of the bracket is configured to form a vertically oriented slot that is open at a top of the slot and configured to receive a zipper slide pull.

6. The latch assembly of claim 5, wherein the main body of the bracket comprises a hole that is situated rearward of the slot and configured to secure a corner strap assembly of a tonneau cover.

\* \* \* \* \*